Patented Nov. 6, 1928.

1,690,648

UNITED STATES PATENT OFFICE.

EDWIN K. O'BRIEN, OF CHARLOTTESVILLE, VIRGINIA.

PLASTIC PREPARATION.

No Drawing. Substitute for application Serial No. 752,025, filed November 24, 1924. This application filed November 26, 1927. Serial No. 236,013

This invention relates to plastic preparations, and has for its object the production of a new article of manufacture comprising portions of the plant known as the Jerusalem artichoke. Knowledge of this plant is general, and it may be raised in all classes of soil. Its tubers or roots have been fed to swine and cattle.

This applicant has discovered that by dividing the stems or stalks into short pieces and drying them, and thereafter reducing the pieces to a powder more or less fine, when the material thus prepared is mixed with water to form a plastic compound, it may be molded into selected shapes, or fashioned into sheets, which will harden as it dries. The sheets may be used for all purposes to which so-called plaster boards are applied, and it is found that the artificial stone-like solid thus made is of unusual strength and resists fracture to a greater degree than is the case with those plaster boards with which this applicant is acquainted.

This application is a re-filing of the application of this applicant for the same invention, filed November 24, 1924, Serial Number 752,025, allowed January 21, 1925.

It is thought after experimentation and investigation that this plant has intermingled with the fibers of its stems, leaves and roots, enough sugar, starch and gum resins to form the plastic material as explained above. It is thought also that when the cells containing the sugar and other substances are broken up, the gummy substances are re-distributed through the material, and when powdered and mixed with water it may be molded in plastic condition or applied with a brush like paint when in a more fluid state. When only dried and powdered, the material is not waterproof as some of the sugar is soluble. But, the addition of lime changes the sugar in the subsequent mixture into an insoluble calcium compound and renders the mass waterproof, and it is believed such addition increases the hardness and strength of the resulting body.

It is the experience of this applicant that the material in sheets or block formations made by using the preparation constituting this invention as explained, may be cut into a variety of shapes by suitable tools, it may be rendered waterproof by the addition of lime, it will resist vermin and general deterioration by the introduction of any of the wood antiseptics, such as beta-naphthol, creosote, zinc chloride, copper salts or equivalents. It can be dyed, painted, plastered or papered over, and made fireproof to a considerable degree by the incorporation of suitable chemicals such as the silicate of soda. By the addition of sand the material may be made into rock or brick paving or wall construction. The applicant has several samples of such compositions which he has made. This invention is also advantageously employed as a cement for a variety of purposes.

Having now described my invention, what I claim is:—

1. As a new article of manufacture, a preparation comprising portions of the plant known as the Jerusalem artichoke reduced to a finely divided condition.

2. As a new article of manufacture, a preparation for fluid, partly fluid or plastic purposes, comprising portions of the plant known as the Jerusalem artichoke dried and reduced to a finely divided condition.

3. As a new article of manufacture, a preparation comprising portions of the plant known as the Jerusalem artichoke dried and reduced to a finely divided condition capable of being mixed with fluid to form a plastic, fluid or partly fluent mixture.

4. As a new article of manufacture, a preparation comprising portions of the plant known as the Jerusalem artichoke dried and reduced to powdered form and capable of being mixed with water to make a plastic, fluid or partly fluent mixture.

5. As a new article of manufacture, a preparation comprising portions of the plant known as the Jerusalem artichoke dried and reduced to a finely divided condition, mixed with substances adapted to render the whole resistant to deteriorating effects of heat and moisture.

In testimony whereof I affix my signature.

EDWIN K. O'BRIEN.